United States Patent [19]
Wade et al.

[11] 3,768,347
[45] Oct. 30, 1973

[54] AUTOMATIC CARPET CUTTING MACHINE

[76] Inventors: Marvin C. Wade, 506 Mosedale Dr.; Lamar Montgomery, 932 Ave. E, both of Dalton, Ga. 30720

[22] Filed: June 23, 1972

[21] Appl. No.: 265,954

[52] U.S. Cl. .................. 83/1, 33/27 K, 83/471.2, 83/490, 83/524, 83/565, 83/925 CC
[51] Int. Cl. ............................... B26d 1/18
[58] Field of Search ............... 83/565, 484, 554, 83/471.2, 471, 483, 490, 524, 925 CC, 56, 821, 829, 1, 326, 469; 33/27 K; 144/144 R

[56] References Cited
UNITED STATES PATENTS

| | | | |
|---|---|---|---|
| 3,254,684 | 6/1966 | Hawkins | 83/565 X |
| 1,488,502 | 4/1924 | Hulscher | 83/925 CC UX |
| 2,517,901 | 8/1950 | Luckenbach | 33/27 K X |
| 2,026,109 | 12/1935 | Walters | 33/27 K |
| 2,536,650 | 1/1951 | Martinez | 33/27 K X |

*Primary Examiner*—Andrew R. Juhasz
*Assistant Examiner*—James F. Coan
*Attorney*—A. Yates Dowell, Jr.

[57] ABSTRACT

Apparatus for automatically cutting carpet material to a predetermined size and configuration includes a frame having a support surface with a cutting implement adjustably and movably mounted on top of the frame in engagement with the carpet material and a drive mechanism located below the surface for moving the cutting mechanism along a predetermined path of movement.

7 Claims, 11 Drawing Figures

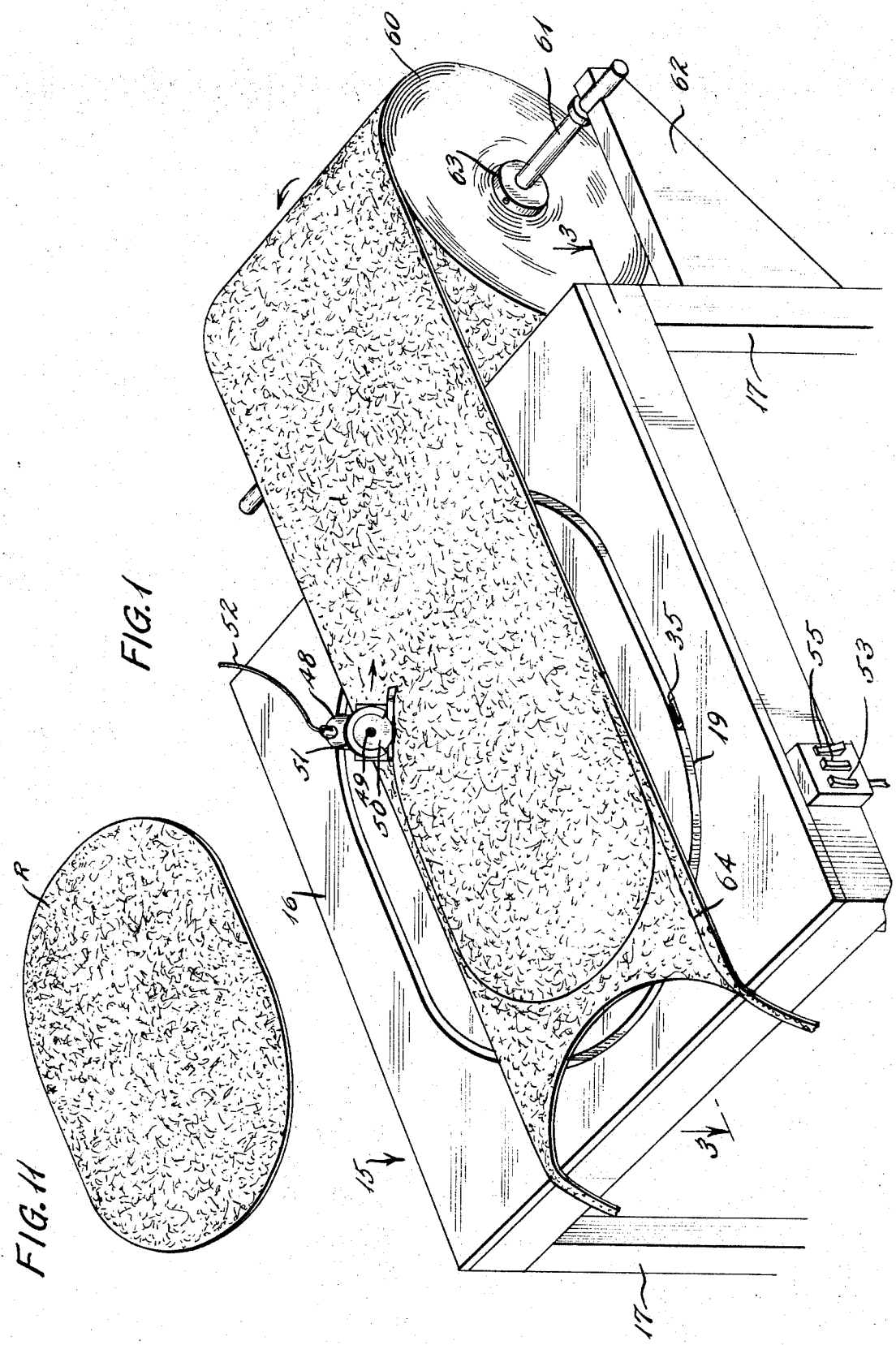

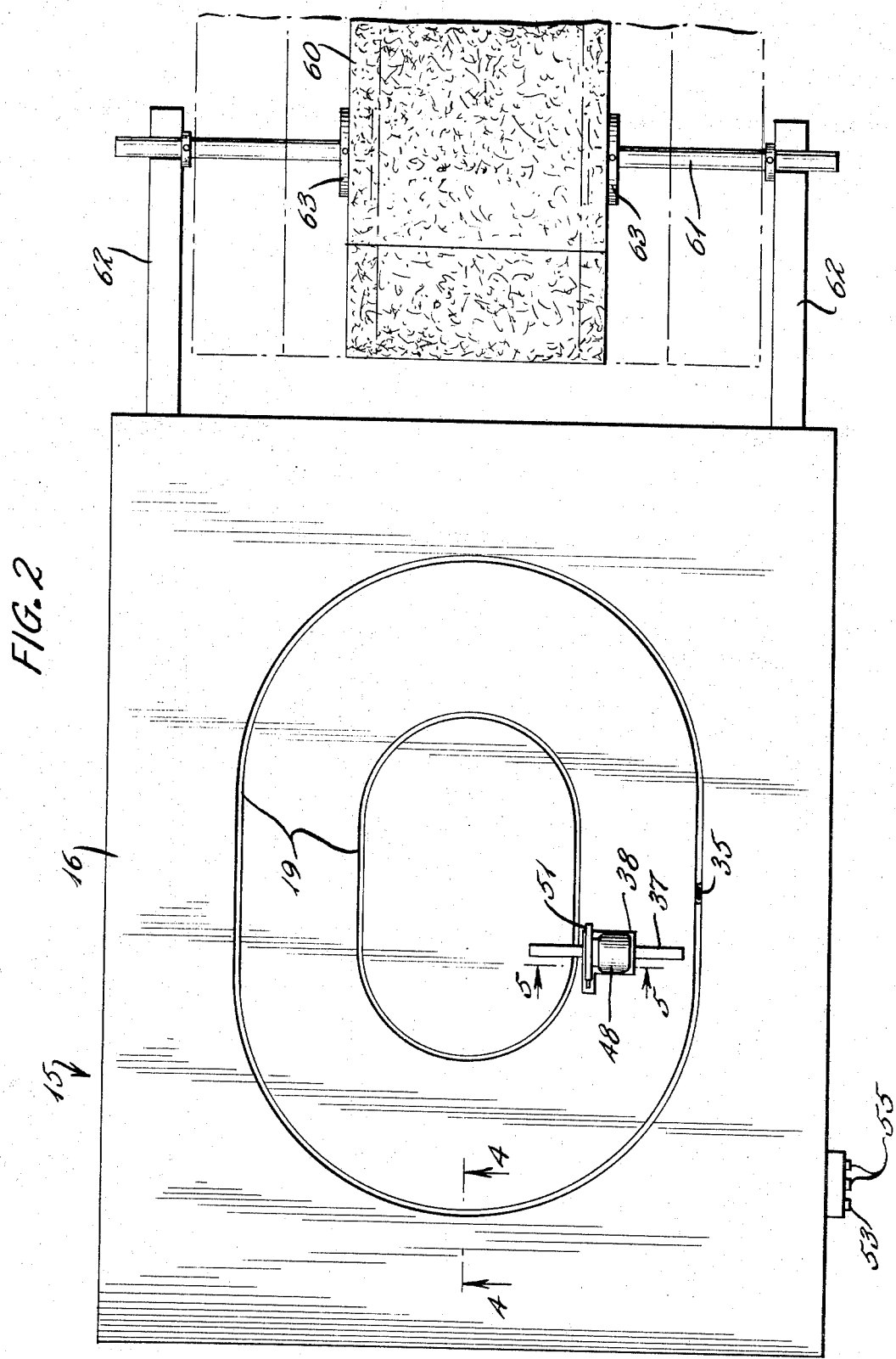

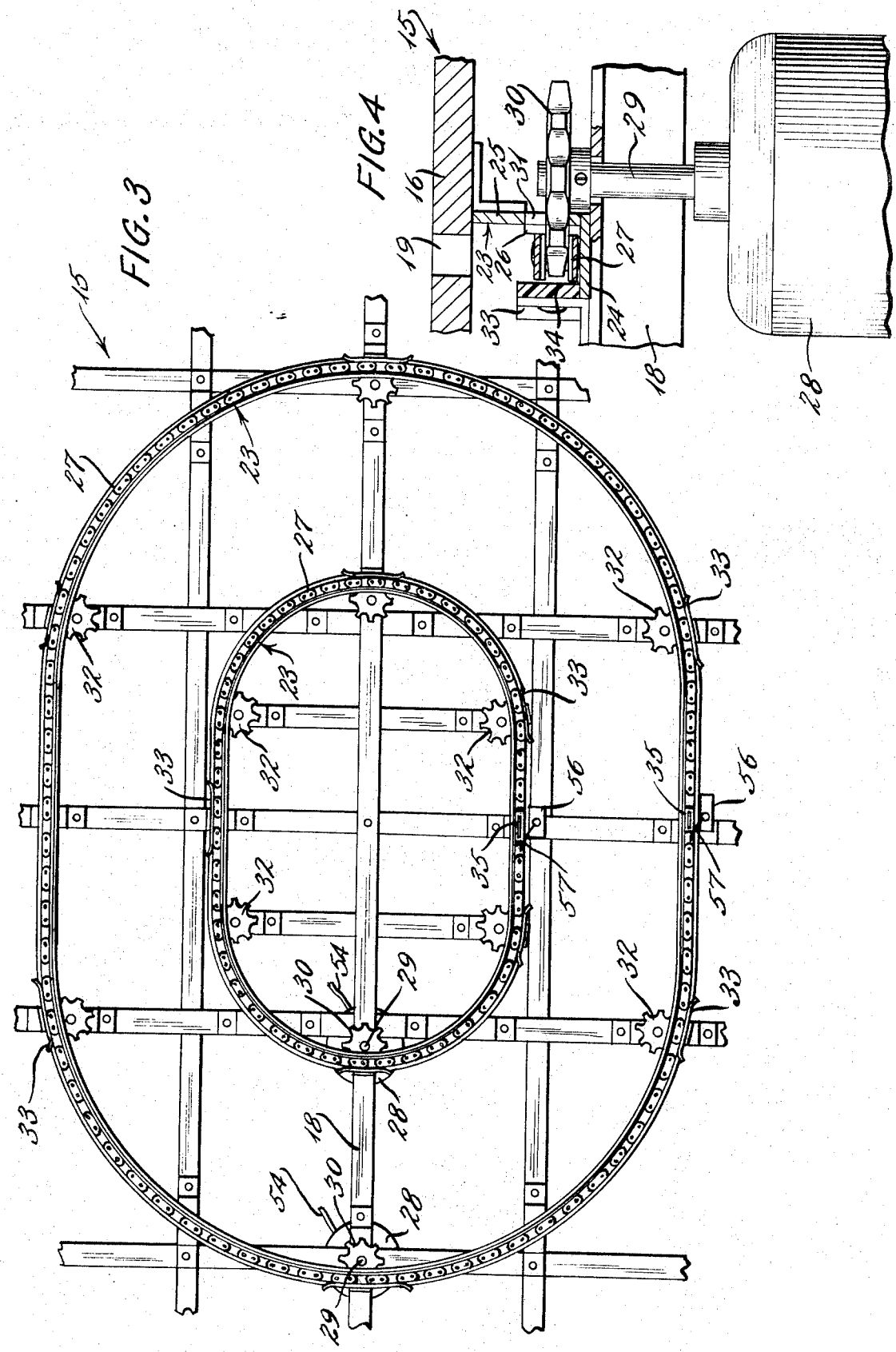

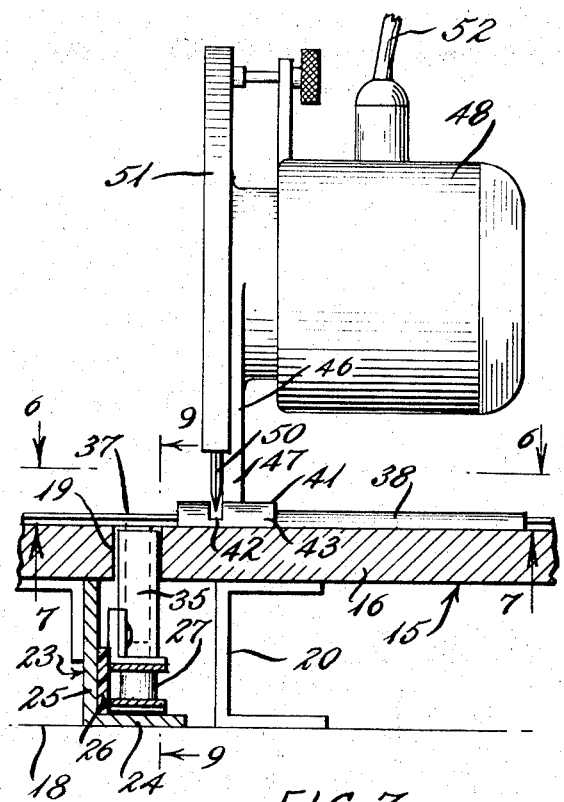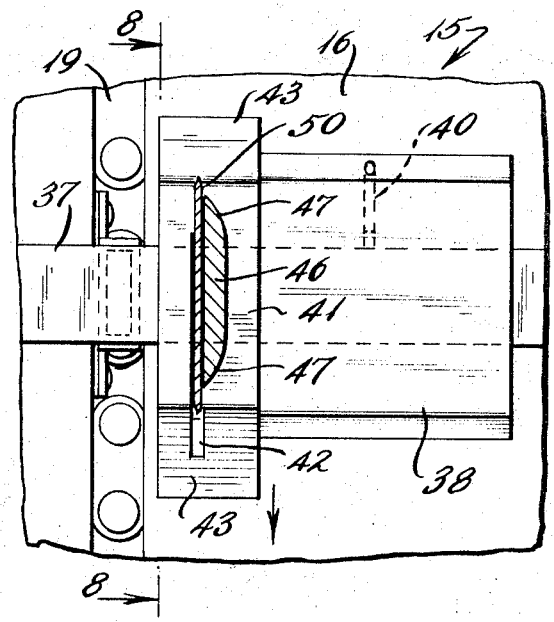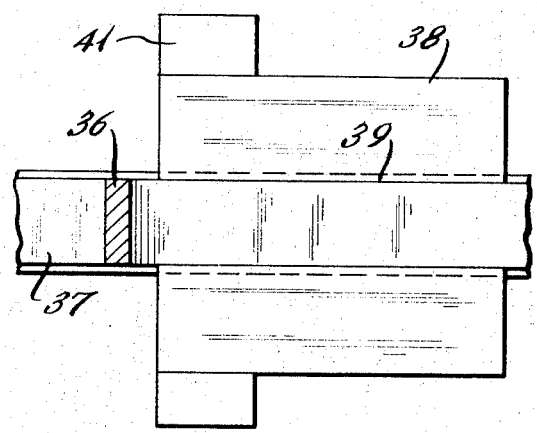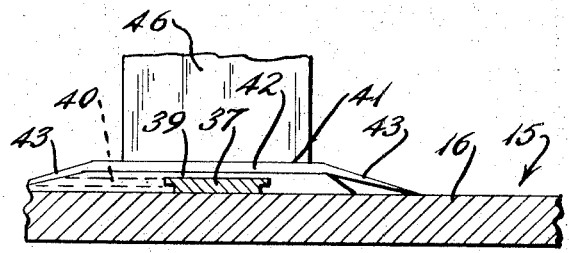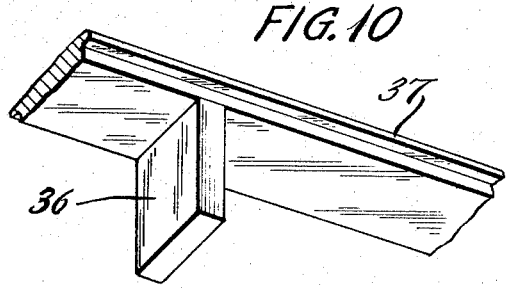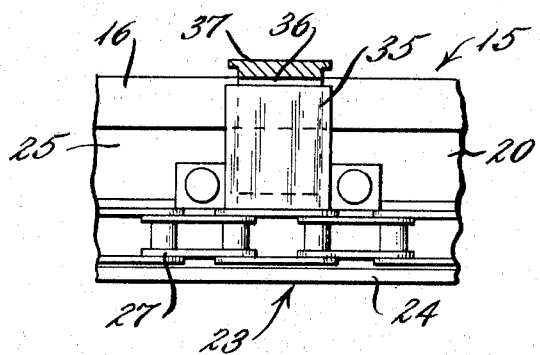

AUTOMATIC CARPET CUTTING MACHINE

BACKGROUND OF THE INVENTION

1. Field of the Invention

This invention relates generally to the cutting of sheet material in a predetermined pattern and relates particularly to apparatus for automatically cutting woven and non-woven sheet material, such as used in the manufacture of rugs and the like, to a predetermined size and configuration.

2. Description of the Prior Art

In the past, generally rectangular rugs and other woven and non-woven sheet materials have been formed automatically by rug making machines and knitting machines after which the edges have been bound or hemmed to prevent ravelling and the article has been rolled or folded for storage and shipping.

Non-rectangular woven and non-woven sheet materials, such as rugs, tablecloths and the like, normally have required that a template or pattern be placed on the material after which a hand operated cutter was used to cut the material to the configuration of the template. This has not always been satisfactory due to the amount of manual labor involved, as well as the shifting of the template while in use, and has resulted in pieces of material which were not true to the pattern.

It is know that machines for cutting cloth have been used in the past, as exemplified by the U.S. Pat. Nos. to Zawistowski 1,319,809; Etchen 2,627,657; and Hazzard 2,861,340. These prior devices have been either manually operated or the device has been stationary and the cloth has been moved relative to the cutter. Chain driven apparatus for cutting predetermined contours in relatively flat objects also have been known, as exemplified by the U.S. Pat. Nos. to Luckenbach 2,517,901 and Martinez 2,536,650.

SUMMARY OF THE INVENTION

The present invention is an apparatus for automatically cutting rugs or other articles of woven or non-woven sheet materials to a predetermined size and configuration and includes a frame having a relatively flat top with at least one continuous slot extending therethrough. A track is located below each slot and such track is adapted to guide a flexible drive member such as a chain or the like along a predetermined path in registration with the slot in the top. A base member is located above the top of the frame and is connected to the flexible drive member through the slot in such a manner that when the drive member is moved, the base member likewise will be moved. A cutting implement is mounted on the base in a position to cut the rug or other material when the drive member is operated. The base is adjustable and is adapted to be fixed in adjusted position so that the material can be cut to a predetermined size.

It is an object of the invention to provide apparatus for cutting rugs and other articles of woven or non-woven materials to a predetermined size having a non-rectangular configuration.

Another object of the invention is to provide a cloth cutter which is moved through a specified configuration and automatically stops the drive mechanism when the cutter returns to its starting position, while permitting the cutter blade to continue operating.

BRIEF DESCRIPTION OF THE DRAWINGS

FIG. 1 is a perspective illustrating one application of the invention.

FIG. 2 is a top plan view thereof.

FIG. 3 is an enlarged section on the line 3—3 of FIG. 1.

FIG. 4 is an enlarged section on the line 4—4 of FIG. 2.

FIG. 5 is an enlarged section on the line 5—5 of FIG. 2.

FIG. 6 is a section on the line 6—6 of FIG. 5 illustrating a top plan view of the base member.

FIG. 7 is a section on the line 7—7 of FIG. 5 illustrating a bottom plan view of the base member.

FIG. 8 is a section on the line 8—8 of FIG. 6.

FIG. 9 is a section on the line 9—9 of FIG. 5.

FIG. 10 is a fragmentary perspective of the slide member.

FIG. 11 is a perspective of a rug which has been cut by the apparatus.

DESCRIPTION OF THE PREFERRED EMBODIMENT

With continued reference to the drawings, a table or support frame 15 is provided having a relatively flat top 16 supported by legs 17 and a subframe 18. The top 16 has one or more continuous slots 19 extending entirely through the top 16 for a purpose which will be described later. The exterior portion of the top is supported directly by the legs 17 and the inner portion or portions are supported in coplanar or coextensive relationship with the outer portions of the top by means of upstanding supports 20 carried by the subframe 18. If desired the subframe may be supported by the legs 17 or may include additional legs (not shown) for supporting the subframe from the floor or other supporting structure.

As illustrated best in FIGS. 3–5, a track 23 is provided for each slot 19 and such tracks are supported by the subframe 18 substantially in registration with the corresponding slots 19 in the top 16. Each track includes a generally horizontal portion 24 and a generally vertical portion 25. A wear strip 26 of material having a low coefficient of friction, such as Teflon or the like, is mounted on the vertical portion 25 of the track in any desired manner as by adhesive (not shown). A flexible drive member 27, such as a chain, cable, rope or the like, slidably engages the wear strip 26.

In order to move the drive members 27, a power plant 28, such as an electric motor, hydraulic motor or internal combustion engine, is mounted on the subframe 18 adjacent to each of the tracks 23 and each power plant has a drive shaft 29. A sprocket or drive pulley 30 is mounted on the drive shaft 29 and extends through an opening 31 in the vertical portion of the adjacent track 23 to engage and drive the drive member 27. A plurality of idlers 32 are supported by the subframe 18 are located around the inner periphery of each track 23 and such idlers extend through openings in the vertical portion 25 of the tracks to engage and guide the drive members 27. Preferably a plurality of guide plates 33, each of which has a wear strip 34 on its inner surface, are located about the outer periphery of the drive members 27 to maintain the drive members on the tracks.

A hollow body 35 is riveted or otherwise attached to the drive member 27 and such hollow body extends upwardly through the slot 19 to a position slightly below the upper surface of the top 16. A drag bar 36 is adapted to be selectively received within the hollow body such drag bar is welded or otherwise attached at its upper extremity to a transversely extending slide bar 37. Such slide bar is located adjacent to the top 16 of the table and disposed generally normal to the path of travel of the drive member 27. With reference to FIGS. 8 and 10, the slide bar 37 is generally T-shaped, although if desired the slide bar could be dovetailed or of other cross-sectional configuration.

A base plate 38 having a groove 39 of a configuration corresponding to the configuration of the slide bar 37 is slidably mounted on such slide bar with the bottom surface of the base plate normally in engagement with the table top 16. A spring-loaded pin or set screw 40 is provided for securing the base plate 38 in fixed adjusted position on the slide bar 37. A foot plate 41 having a groove or recess 42 is attached to the base plate 38 and such foot plate has a downwardly inclined bevelled edge 43 at each end to cause the material being cut to ride up over the foot plate.

An upright standard 46 having outwardly tapered bevelled edges 47 is welded or otherwise attached to the foot plate 41 and such standard supports an electric motor or other power plant 48 having a drive shaft 49 on which a cutting blade 50 is fixed. A shield 51 is located about the upper periphery of the blade and the lower portion of the blade extends into the groove 42 of the foot plate to insure that the material being cut is entirely severed. The electric motor 48 is connected by a conduit 52 to an on-off switch 53 mounted in any convenient location, such as the side of the table 15. The switch 53 is connected to any convenient source of electrical energy. The power plants 28 are connected by electrical conduits 54 to corresponding switches 55 preferably located adjacent to the switch 53. With reference to FIG. 3, a cutoff switch 56 having a switch arm 57 is mounted on the subframe 18 adjacent to each track 23 with the arm 57 disposed in the path of travel of the hollow body 36 so that the cutoff switch 56 will stop the power plant 28 after the drive member 27 has made a complete circuit.

It is contemplated that individual lengths of rug material could be placed on the top 16, or the cutting mechanism of the present invention could be associated with a rug making machine which could supply a continuous length of rug material to the cutting machine. As illustrated, a coil 60 of rug material of a predetermined width and an indefinite length is mounted on an axle or shaft 61 carried by support arms 62 mounted on the legs 17. An adjustable collar 63 is located at each side of the coil 60 to guide the rug material in a straight path across the table top 60.

With particular reference to FIG. 2, a pair of slots 19 have been provided which will accommodate several standard sizes of rug R as well as many non-standard sizes. The slide bar 37 extends outwardly across a selected slot so that the base plate 38 can be moved along the slide bar to provide a desired width of cut. As illustrated, the slots are arranged in an oval configuration and the inner slot 19 is used to cut rugs ranging in size from approximately 2 × 4 to approximately 5 × 7, while the outer slot is used to cut rugs ranging in size from approximately 6 × 9 to approximately 9 × 12.

It is noted that the slots 19 could be in a configuration other than oval, such as eliptical, round, or generally rectangular with rounded corners. Also, it is noted that a plurality of layers of material could be arranged in stacked relation so that the present apparatus would cut multiple articles at the same time.

A web of rug material from the coil 60 can be fed manually onto the table top 16 by following guide lines (not shown) on the table top or, if desired, an automatic feed mechanism of conventional design could be added to the apparatus for causing the web of material to advance after the rug R has been cut. While the web of material is being advanced, the cutter blade 50 continues to operate to cut a slit 64 adjacent to one edge of the rug material until the web of material has been advanced to a position slightly greater than the length of the rug to be cut.

In the operation of the device, it is first necessary to determine what size rug or other article is to be cut after which the drag bar 36 is inserted in the appropriate hollow body 35. Thereafter the base plate 38 is moved along the slide bar 37 generally transversely of the table top 16 until the cutter blade 50 is located in the desired position after which the set screw 40 is tightened to hold the base plate in fixed adjusted position. The control switch 53 then is operated to energize the electric motor 48 and drive the cutter blade 50.

While the cutter blade is operating, a web of material from the coil 60 is moved along the table top and under the cutting blade 50 which cuts a slit 64 adjacent to one edge of the material. When the material has been advanced to a predetermined location, depending upon the size of the article to be cut, the feed of the material is halted and the appropriate switch 55 is operated to override the cutoff switch 56 and energize the corresponding power plant 28. Operation of the power plant moves the drive member 27 around the track 23 and moves the base plate 38 and the cutter blade 50 along a predetermined path. When the drive member 27 has completed a circuit, the hollow body 35 engages the switch arm 57 of the cutoff switch which de-energizes the power plant 28. As soon as the power plant is halted, the rug R or other article being cut is removed from the table and the web of material again is advanced.

We claim:

1. Apparatus for cutting at least one article from a web of flexible sheet material comprising a frame having a substantially flat upper surface for supporting a web of sheet material, at least one continuous slot extending through said upper surface, track means mounted below said upper surface and having a configuration corresponding substantially to the configuration of said slot, a drive member movably mounted on said track means, a body connected to said drive member and extending upwardly therefrom, bar means selectively connected to said body, said bar means being located above the upper surface of said frame and movable relative thereto, a base carried by said bar means, and cutting means mounted on said base in a position to engage said web of sheet material on said upper surface, whereby movement of said drive member along said track means causes said cutting means to cut said sheet material in a predetermined configuration and size.

2. The structure of claim 1 in which said drive member includes a chain and a selectively operable power plant having sprocket means engaging said chain for driving the same.

3. The structure of claim 2 including automatic cut-off switch means for de-energizing said power plant when said drive member has made a complete circuit of said track means.

4. The structure of claim 1 including means for adjustably mounting said base on said bar means to vary the size of the article being cut from said web of material.

5. The structure of claim 1 in which said body is hollow, and said bar means includes a drag bar selectively received within said hollow body.

6. An automatic carpet cutting machine for cutting a carpet from a web of woven or non-woven sheet material comprising a frame having a substantially flat upper surface for supporting a web of sheet material, a plurality of continuous slots extending through said upper surface, track means mounted below said upper surface and in registration with each of said slots, a drive chain movably mounted on each of said tracks, a selectively operated power plant having sprocket means engaging said chain for driving the same, a body mounted on each of said chains and extending upwardly substantially through the corresponding slot, slide bar means located above the upper surface of said frame and beneath said web of material and selectively connected to said body, a base adjustably mounted on said slide bar means, means for securing said base to said slide bar means in fixed adjusted position, an upright standard carried by said base and extending through said material, a cutting blade located adjacent to said standard and being rotatably mounted thereon, means for driving said cutting blade, and said cutting blade being operated substantially continuously, whereby selective operation of said power plant causes said drive chain to move along said track and cause said cutting blade to cut a carpet of a predetermined configuration and size from said web of material.

7. The structure of claim 6 including a wear strip of a material having a low coefficient of friction disposed between said chain and said track.

* * * * *